United States Patent [19]

Bauer et al.

[11] Patent Number: 5,340,858
[45] Date of Patent: Aug. 23, 1994

[54] AQUEOUS POLYMER DISPERSIONS

[75] Inventors: Gerhard Bauer, Weinheim; Oral Aydin, Mannheim; Josef Neutzner, Neustadt, all of Fed. Rep. of Germany

[73] Assignee: BASF Aktiengesellschaft, Ludwigshafen, Fed. Rep. of Germany

[21] Appl. No.: 51,167

[22] Filed: Apr. 22, 1993

[30] Foreign Application Priority Data

Apr. 29, 1992 [DE]  Fed. Rep. of Germany ....... 4213964

[51] Int. Cl.$^5$ .............................................. C08L 9/08
[52] U.S. Cl. ................................ 524/162; 524/458; 524/460; 524/160; 524/161; 524/159
[58] Field of Search ............... 524/458, 460, 159, 160, 524/161, 162

[56] References Cited

U.S. PATENT DOCUMENTS

| | | | |
|---|---|---|---|
| 3,424,706 | 1/1969 | Smith et al. | 524/460 |
| 4,017,442 | 4/1977 | Gibbs et al. | 524/460 |
| 4,130,523 | 12/1978 | Hoy et al. | |
| 4,539,361 | 9/1985 | Siol et al. | 524/460 |

FOREIGN PATENT DOCUMENTS

| | | |
|---|---|---|
| 0332011 | 9/1989 | European Pat. Off. . |
| 0338486 | 10/1989 | European Pat. Off. . |
| 0348565 | 1/1990 | European Pat. Off. . |
| 0359562 | 3/1990 | European Pat. Off. . |
| 0478193 | 4/1992 | European Pat. Off. . |
| 0129699 | 1/1985 | Fed. Rep. of Germany . |

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Final aqueous polymer dispersions are obtainable by polymerizing radical polymerizable monomers with the addition of an aqueous dispersion of a starting polymer by the method of free radical aqueous emulsion polymerization.

13 Claims, No Drawings

AQUEOUS POLYMER DISPERSIONS

The present invention relates to final aqueous polymer dispersions obtainable by polymerizing a mixture of radical polymerizable monomers comprising A) from 60 to 100% by weight of at least one monomer from the group consisting of aromatic vinyl compounds having up to 20 carbon atoms, olefins of from 2 to 8 carbon atoms, vinyl and vinylidene halides, vinyl esters of monocarboxylic acids of from 1 to 20 carbon atoms, esters of $\alpha,\beta$-monoethylenically unsaturated mono- and dicarboxylic acids of from 3 to 6 carbon atoms with alkanols of from 1 to 20 carbon atoms, and monoethylenically unsaturated nitriles of from 3 to 6 carbon atoms, and B) from 0 to 40% by weight of other radical copolymerizable monomers other than conjugated hydrocarbons, with the addition of at least one aqueous dispersion of a starting polymer in a polymerization vessel by the method of free radical aqueous emulsion polymerization in the presence of surface active substances and free radical polymerization initiators with the proviso that a) the starting polymer is present in the at least one aqueous dispersion in the form of dispersed starting polymer particles whose weight average particle diameter is from 10 to 100 nm, b) the total amount of starting polymer added in the form of the at least one aqueous dispersion of a starting polymer is from 0.01 to 10% by weight, based on the total amount of final polymer, c) of the total amount of the at least one aqueous dispersion of a starting polymer to be added the amount introduced into the polymerization vessel as initial charge prior to the start of the free radical aqueous emulsion polymerization is such that the total amount of starting polymer introduced as initial charge is at least 5% by weight of the total amount of starting polymer to be added in the form of the at least one aqueous dispersion, d) of the total amount of the at least one monomer to be polymerized the amount introduced into the polymerization vessel as initial charge prior to the start of the free radical aqueous emulsion polymerization is either nil or at most 15% by weight of the total amount, e) after the start of the free radical aqueous emulsion polymerization the proportion added to the polymerization vessel of the at least one aqueous dispersion of a starting polymer to be added is at most such that the amount of starting polymer contained in this added part comprises not more than 95% by weight of the total amount of starting polymer to be added, f) after the start of the free radical aqueous emulsion polymerization at least 85% by weight of the total amount of the at least one monomer to be polymerized is added to the polymerization vessel, in such a way that at any time of this addition the polymerization conversion of the monomers already added previously to the polymerization vessel including the monomers introduced into the polymerization vessel as initial charge is at least 80%, preferably at least 90% based on the total amount formed from the monomers added previously to the polymerization vessel and from the monomers introduced into the polymerization vessel as initial charge, g) at any time after the start of the free radical aqueous emulsion polymerization the ratio V of the mass already added previously to the polymerization vessel of the at least one starting polymer including the proportion of the at least one starting polymer introduced into the polymerization vessel as initial charge to the mass of the amount of the at least one monomer already added previously to the polymerization vessel including the proportion of the at least one monomer introduced into the polymerization vessel as initial charge, standardized for the ratio of the mass of the total amount of the at least one starting polymer to be added to the mass of the total amount of the at least one monomer to be polymerized, is not less than 0.3, h) after the end of the addition of the at least one monomer no further addition takes place of the at least one aqueous dispersion of a starting polymer, i) the final aqueous polymer dispersion contains from 1 to 8% of surface active substances, based on the total mass formed from the mass of the at least one radical polymerizable monomer and from the mass of starting polymer to be added in the form of the at least one aqueous dispersion, j) at any time after the start of the free radical aqueous emulsion polymerization the mass of the amount of surface active substances present in the polymerization vessel relative to the mass of the total amount of monomers and polymer present in the polymerization vessel is at least 1%, and k) the total amount used of free radical polymerization initiators is from 0.1 to 5% by weight, based on the total amount of the at least one monomer to be polymerized, and is added to the polymerization vessel in the course of the free radical aqueous emulsion polymerization in such a way that the free radical aqueous emulsion polymerization continues to a minimum polymerization conversion of at least 90% of the total amount of the at least one monomer to be polymerized.

The present invention further relates to the process for preparing such final aqueous polymer dispersions and to the use thereof as binders and as materials for preparing coatings and adhesive joints.

Aqueous polymer dispersions are systems comprising polymer particles dispersed as disperse phase in an aqueous dispersion medium.

Polymer solutions form polymer films as the solvent evaporates. Aqueous polymer dispersions behave the same way on evaporation of the aqueous dispersion medium, which is why aqueous polymer dispersions find varied use as binders, as adhesives or as materials for coatings.

However, compared with polymer solutions, aqueous polymer dispersions have the disadvantage that the dispersed polymer particles tend to aggregate for reasons of thermodynamic stability. The flocs which form in particular during the preparation of aqueous polymer dispersions can be roughly divided into two groups: microflocs or specks on the one hand and macroflocs or coagulum on the other. Whereas the latter are visible in the liquid dispersion even to the naked eye and are normally removable by conventional filtration, specks can in general not be separated off by conventional filtration and are not visible to the naked eye in the liquid dispersion. At best only microflocs will form, which, although they do not make the processing of the aqueous polymer dispersion impossible, do lead in the films formed from the aqueous polymer dispersions to local defects that are visible to the naked eye and therefore are as undesirable as coagulum. Furthermore, films formed from aqueous polymer dispersions are not fully satisfactory in gloss compared with films formed from polymer solutions.

It is an object of the present invention to make available aqueous polymer dispersions that are obtainable in a simple, industrially suitable, reproducible manner with a reduced floc content and whose films have an enhanced gloss as required in many cases for aesthetic and application reasons.

We have found that this object is achieved by the final aqueous polymer dispersions defined at the beginning.

EP-A-129 699, U.S. Pat. No. 4,130,523 and U.S. Pat. No. 3,427,706 disclose processes for free radical aqueous emulsion polymerization of radical polymerizable monomers with the addition of aqueous dispersions of a starting polymer. However, these polymerization processes have the purpose of obtaining a very high solids volume concentration for the polymer or a very broad particle size distribution of the dispersed polymer particles.

Examples of aromatic vinyl monomers suitable for use as monomers A are styrene, α-methylstyrene, o-chlorostyrene and vinyltoluenes, of which styrene is preferred. Suitable olefinic monomers are in particular ethylene. The vinyl and vinylidene halides are chlorine-, fluorine- or bromine-substituted monoethylenically unsaturated compounds, preferably vinyl chloride and vinylidene chloride. Particularly suitable vinyl esters are vinyl acetate, vinyl propionate, vinyl n-butyrate, vinyl laurate and vinyl stearate. Particularly suitable esters of α,β-monoethylenically unsaturated mono- and dicarboxylic acids of from 3 to 6 carbon atoms with alkanols of from 1 to 20 carbon atoms are the esters of acrylic and methacrylic acid with alkanols having in general from 1 to 12, preferably from 1 to 8, in particular from 1 to 4, carbon atoms. Very particular preference is given to ethyl acrylate and n-butyl acrylate, especially if combined with methyl methacrylate. Examples of highly suitable nitriles are acrylonitrile and methacrylonitrile.

Group B comprises inter alia monomers which polymerized by themselves normally form homopolymers that possess enhanced water solubility. Examples of monomers of this type are α,β-monoethylenically unsaturated mono and dicarboxylic acids of from 3 to 6 carbon atoms and amides thereof, e.g. acrylic acid, methacrylic acid, maleic acid, fumaric acid, iraconic acid, acrylamide and methacrylamide, also vinylsulfonic acid and water-soluble salts thereof, and also N-vinylpyrrolidone. Preferably, these monomers are included in the polymer in a weight proportion of from 0.5 to 20, particularly preferably from 1 to 10, % by weight, based on the total amount of monomers to be polymerized. Monomers B which customarily enhance the internal strength of the films formed from the final aqueous polymer dispersions are advantageously likewise included in the polymer only in minor amounts, usually from 0.5 to 10% by weight, based on the total amount of monomers to be polymerized. Monomers of this type normally have an epoxy, hydroxyl, N-methylol or carbonyl group. Examples thereof are N-alkylolamides of α,β-monoethylenically unsaturated carboxylic acids of from 3 to 10 carbon atoms and esters thereof with alcohols of from 1 to 4 carbon atoms, of which N-methylolacrylamide and N-methylolmethacrylamide are particularly preferred. Of particular suitability among these are also the monoesters of dihydric or polyhydric alcohols with α,β-monoethylenically unsaturated monocarboxylic acids, of which in turn acrylic and methacrylic acid are preferred. Of particular importance are for example the $C_1$–$C_8$-hydroxyalkyl esters of methacrylic acid and acrylic acid, such as n-hydroxyethyl, n-hydroxypropyl or n-hydroxybutyl acrylate and methacrylate, and also compounds such as diacetoneacrylamide and acetylacetoxyethyl acrylate or methacrylate.

Further suitable monomers B are the derivatives of amides of α,β-monoethylenically unsaturated carboxylic acids of from 3 to 6 carbon atoms that are substituted at the nitrogen by $C_1$–$C_4$-alkyl, and also esters of acrylic and methacrylic acid with monohydric alcohols of from 1 to 20 carbon atoms which in addition to the oxygen atom in the alcohol group contain at least one further hereto atom and/or an aliphatic or aromatic ring. Examples are 2-ethoxyethyl acrylate, 2-butoxyethyl acrylate, dimethylaminoethyl acrylate, cyclohexyl acrylate, phenylethyl acrylate, furfur-yl acrylate and the corresponding methacrylates. As well as monomers having unsaturated double bonds it is possible for minor Mounts, customarily from 0.01 to 2% by weight, based on the monomers to be polymerized, of molecular weight regulators, such as tertdodecyl mercaptan and 3-mercaptopropyltrimethoxysilane, to be included in the polymer. It is preferable to add such substances to the polymerization zone nixed with monomers to be polymerized. Final aqueous polymer dispersions having a particularly low floc content and producing films of particularly enhanced gloss are obtained on polymerizing monomer mixtures of the following composition:

90–100% by weight of at least one monomer from the group consisting of styrene, esters of acrylic or methacrylic acid with alkanols of from 1 to 8 carbon atoms, acrylonitrile and methacrylonitrile, and 0–10% by weight o f one or more monomers from the group consisting of acrylic acid, methacrylic acid, acrylamide, methacrylamide, n-hydroxyethyl acrylate, n-hydroxybutyl acrylate, n-hydroxybutyl methacrylate, N-alkylolamides of acrylic and methacrylic acid with alcohols of from 1 to 4 carbon atoms, diacetoneacrylamide and acetylacetoxyethyl methacrylate.

Very particular preference is given to monomer mixtures comprising:

55–90% by weight of ethyl acrylate, n-butyl acrylate or a mixture thereof,

10–40% by weight of methyl methacrylate, and

0–10% by weight of acrylic acid, methacrylic acid, acrylamide, methacrylamide, n-hydroxyethyl acrylate, diacetoneacrylamide, acetylacetoxyethyl methacrylate or a mixture thereof.

Suitable surface active substances include not only the protective colloids customarily used for carrying out free radical aqueous emulsion polymerizations but also emulsifiers. Examples of suitable protective colloids are polyvinyl alcohols, cellulose derivatives or vinylpyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the surface active substances used are exclusively emulsifiers whose relative molecular weights are customarily below 1000, in contradistinction to the protective colloids. They can be anionic, cationic or nonionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3-60, alkyl radical: $C_4$-$C_{10}$), ethoxylated fatty alcohols (EO degree: 3-50, alkyl radical: $C_8$-$C_{36}$), and also alkali metal and ammonium salts of alkyl sulfates (alkyl radical: $C_8$-$C_{12}$), of sulfuric acid monoesters of ethoxylated alkanols (EO degree: 4-30, alkyl radical: $C_{12}$-$C_{18}$), and ethoxylated alkylphenols (EO degree: 3-50, alkyl radical: $C_4$-$C_9$), of alkylsulfonic acids (alkyl radical: $C_{12}$-$C_{18}$), of sulfonated, ethoxylated alkylphenols (EO degree 2-10, alkyl radical: $C_4$-$C_{10}$) and of alkylarylsulfonic acids (alkyl radical: $C_9$-$C_{18}$). Further suitable emulsifiers may be found in Houben-Weyl, Methoden der organischen Chemie, Volume XIV/1, Makromolekulare Stoffe, Georg Thieme Verlag, Stuttgart, 1961, pages 192 to 208.

Particularly suitable surface active substances are compounds of the general formula I

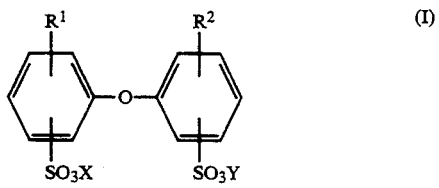

where $R^1$ and $R^2$ are each hydrogen or $C_4$-$C_{24}$-alkyl but are not both hydrogen, and X and Y are each an alkali metal or ammonium ion. In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax ®2A1 (trademark of the Dow Chemical Company). Compounds I are generally known, for example from U.S. Pat. No. 4,269,749, and are commercially available.

It is preferable for the compounds I to be used in the process of the invention mixed with ethoxylated alkylphenols (degree of ethoxylation preferably 45-55, alkyl radical preferably 8-10), ethoxylated fatty alcohols (preferably $C_{15}$-$C_{20}$, degree of ethoxylation preferably 16-22) or with alkali metal salts of sulfonated ethoxylated alkylphenols (degree of ethoxylation preferably 3-6, alkyl radical preferably $C_7$-$C_9$) (mixing ratio in proportions by weight preferably from 3:1 to 1:3), in which case the mixtures with the ethoxylated fatty alcohols are very particularly preferred. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxodisulfates, such as sodium peroxodisulfate, but also azo compounds. Preference is given to using combined systems composed of at least one organic reducing agent and at least one peroxide and/or hydroperoxide, e.g. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although in place of ascorbic acid it is also common to employ the sodium salt of hydroxymethanesulfinic acid, sodium sulfite, sodium bisulfite or sodiurametabisulfite and instead of hydrogen peroxide it is common to employ tert-butyl hydroperoxide or alkali metal peroxodisulfates and/or ammonium peroxodisulfates. Instead of a water-soluble iron(II) salt it is common to employ a combination of water-soluble Fe/V salts. The amount of free radical initiator systems used is preferably from 0.1 to 2% by weight, based on the total count of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperatures employed will be between room temperature and 100° C., preferably within the range from 50° to 95° C. The employment of superatmospheric or reduced pressure is possible, so that the polymerization temperature may also exceed 100° C. and may in fact be as high as 130° C. Volatile monomers such as ethylene or vinyl chloride are preferably polymerized under superatmospheric pressure.

The monomer compositions mentioned as suitable for the free radical aqueous emulsion polymerization of the invention are suitable not only for use as constituents of the monomer mixture to be polymerized, but also, in the same way as the free radical polymerization initiators and molecular weight regulators recommended for the free radical aqueous emulsion polymerization of the invention, for use as constituents of the starting polymer, although the monomer, regulator and initiator composition for the aqueous dispersion of the starting polymer can be not only congruent with but also different from the monomer mixture to be polymerized according to the invention. Particularly good results are obtained when the at least one starting polymer is polystyrene, poly-n-butyl acrylate, or a copolymer of 50 to 55% by weight of n-butyl acrylate, 40 to 45% by weight of methyl methacrylate and 0 to 5% by weight of methacrylic acid or a mixture thereof. This applies mutatis mutandis necessarily also to the surface active substances to be used for preparing the aqueous dispersion of the starting polymer, since in the process of the invention at least part of the surface active substances is used as a component of the at least one aqueous dispersion of a starting polymer to be added. This amount of surface active substances need not of course have already been used in its entirety in the free radical aqueous emulsion polymerization for preparing the aqueous dispersion of the starting polymer. On the contrary, some of it may also be added subsequently to the already fully polymerized aqueous dispersion of the starting polymer. In the extreme case the total amount of surface active substance required in the process of the invention can be added as part of the at least one aqueous dispersion of a starting polymer to be added.

Aqueous dispersions to be added according to the invention of a starting polymer in which the starting polymer is present in the form of dispersed starting polymer particles having a weight average particle diameter of from 10 to 100 nm, preferably from 10 to 50, particularly preferably from 25 to 45 nm, are obtainable in a conventional manner. Appropriate teaching may be found for example in Houben-Weyl, Methoden der Organischen Chemie, Volume E 20, part I, Makromolekulare Stoffe, Georg Thieme Verlag, Stuttgart, 1987, pages 248 to 268. If the solids content is to be a usual 20–40% by weight, the starting dispersions are obtainable in a particularly simple manner, for example by mixing together the aqueous phase, the monomers, the free radical initiators (normally from 0.1 to 5% by weight, based on the amount of starting monomers to be polymerized), and surface active substances (customarily from 0.1 to 30% by weight, based on the starting monomers to be polymerized) at a low temperature and heating the mixture to the polymerization temperature and polymerizing it. Increasing amounts of surface active substances result in a decreasing average particle diameter. Preferably, however, the at least one aqueous dispersion of a starting polymer is prepared by introducing part of the polymerization batch as initial charge, heating it to the polymerization temperature and then adding the remainder to the ongoing polymerization. The initial charge can comprise for example the total amount of the starting monomers, the bulk of the aqueous dispersion medium and also the total amount of surface active substances, so that essentially only the initiator system is left to be added, in general in the form of an aqueous solution. However, the initial charge can also comprise only part of the monomers, part of the surface active substances required, part of the initiator system and a comparatively small proportion of the aqueous dispersion medium. In this case the remaining starting monomers and the remainder of the initiator system are customarily metered in via spatially separate streams, the starting monomers being preferably added in the form of an aqueous emulsion which contains essentially the remaining amounts of surface active substance and of aqueous dispersion medium. To prepare the at least one aqueous dispersion of a starting polymer it is preferable to use only compounds of the general formula I, particularly preferably Dowfax ®2A1. The aqueous starting dispersions thus obtainable are preferably used without subsequent addition of other emulsifiers. As regards the polymerization temperature and pressure for the preparation of the at least one aqueous dispersion of a starting polymer the earlier statements about the process of the invention apply. Of course, some of the aqueous dispersion of a starting polymer to be added according to the invention can be prepared immediately beforehand in the same polymerization vessel in which the actual process of the invention is to be carried out. In fact there can be a smooth transition between the two emulsion polymerization processes, in particular when this initial charge portion of the aqueous dispersion of the starting polymer is prepared employing the stream addition method, in which part of the polymerization batch is introduced as initial charge and heated to the polymerization temperature and the remainder is then added to the ongoing polymerization in a stream or spatially separate streams.

Preferably, the process of the invention is carried out by initially charging the polymerization vessel with at least 50% by weight of the total amount of the at least one aqueous dispersion to be added of a starting polymer, particularly preferably its total amount, which is preferably from 0.2 to 3% by weight, calculated as dry matter and based on the total amount of final polymer. It is also of advantage for the initial charge additionally to contain from 0.5 to 8% by weight of the total amount of monomers to be polymerized, from 5 to 25% by weight of the total amount of the initiator system and from 10 to 25% by weight of the total amount of the surface active substances (this includes the surface active substances initially charged as part of the seed). The initial charge is heated to the polymerization temperature and when a polymerization conversion (herein as usual always based on molar amounts) of at least 80%, preferably at least 90%, based on the initially charged monomers, has been reached, the remainder of the polymerization batch is added to the ongoing polymerization. The remaining monomers are advantageously added to the reaction zone preemulsified in an aqueous phase, preferably in the remainder of the surface active substances to be employed in total, with the addition taking place spatially separate from the addition of the remainder of the initiator system. The aqueous monomer emulsion thus to be added contains in general to 60–90 parts by weight of monomers from 10 to 40 parts by weight of water and from 0.1 to 5 parts by weight of surface active substance. The addition of monomer after the start of the aqueous free radical emulsion polymerization can be carried not only stepwise but also continuously or by the gradient method. If only part of the at least one aqueous dispersion of a starting polymer to be added is introduced as initial charge, this statement also applies to the addition of the remainder of this at least one starting dispersion. If the initial charge comprises only part of the at least one aqueous dispersion of a starting polymer to be added, the free radical aqueous emulsion polymerization can for example also be initiated by heating the initial charge to the polymerization temperature and then starting the addition of monomers and initiator at the same time.

In general, the monomers to be added after the start of the free radical aqueous emulsion polymerization are preferably added continuously, in which case particularly good products of the invention are obtained when the rate of addition increases in the course of the addition, preferably to from 3 to 6 times its initial value. This increase can be not only continuous but also discontinuous. If after the start of the free radical aqueous polymerization aqueous starting dispersion is still being added, the addition thereof preferably takes place synchronously with the addition of the monomers, but as regards the rate of addition preferably in such a way that by comparison the rate of addition of the monomers increases in the course of the monomer addition. In total, the free radical aqueous emulsion polymerization is carried out in such a way that the ratio V is preferably never less than 0.3 after the start of the free radical aqueous emulsion polymerization. Of course, after the start of the free radical aqueous emulsion polymerization the reaction zone may also be supplied with surface active substance alone, in which case this addition advantageously takes place synchronously with the addition of the monomers. Preferably, the free radical aqueous emulsion polymerization is carried out in such a way that at any time after its start the mass of the amount of surface active substances added to the polymerization vessel after the polymerization has started is not more than 6%, based on the mass of the total amount of the monomers and polymer present in the polymerization vessel. In the extreme case, up to 50% of the mass of surface active substances contained in total in the final aqueous polymer dispersion can be added after the actual polymerization process has ended, for the purpose of subsequent stabilization of the final aqueous polymer dispersion. Of course, in the course of the aqueous free radical emulsion polymerization of the invention it is possible for there to be a change in the composition not only of the monomers to be added to the polymerization vessel after the polymerization has started but also of the aqueous dispersion of a starting polymer to be added if necessary to the polymerization vessel after the polymerization has started. In this way it is possible to obtain special structures for the particles of the final polymer, as described for example in Kast, Makromol. Chem. Suppl. 10/11 (1985), 447–461.

On completion of the actual polymerization process the mixture is preferably stirred for some additional hours while the polymerization temperature is maintained. This may be followed by customary measures for residual monomer removal, for setting a different pH or other methods for post-stabilization.

Of course, the various possible, generally spatially separate, feed streams can be mixed with one another immediately before entry into the polymerization vessel. In general, the final aqueous polymer dispersions are prepared with a solids content of from 20 to 60% by weight.

The final aqueous polymer dispersions of the invention are generally obtained as described with fully satisfactory reproducibility and essentially no flocs. Films thereof show enhanced gloss and, remarkably, are in general transparent. They are suitable in general for use as binders and also in particular for use as materials for preparing high-gloss transparent protective layers and also for use as adhesives, in particular for bonding together (laminating) two or more layers of films to form composite films. Bonding together films made of different materials serve to combine properties of these materials. The purpose of such a measure can be to achieve particularly decorative effects or to bring about technical effects such as protection of an imprint, production of boil-resistant film assemblies, suppression of vapor diffusion or resistance to aggressive contents, as required in the field of food packaging. The final aqueous polymer dispersions of the invention are in particular of advantage when transparent films are to be combined with one another. Suitable film materials include inter alia polyethylene, polypropylene, in particular biaxially oriented polypropylene, polyamide, polyester, PVC, polyvinyl acetate, cellophane and metals such as tin and aluminum. Of course, before use the final aqueous polymer dispersions of the invention may have mixed into them in a conventional manner additional materials such as film forming aids, fillers or plasticizers. Particularly highly suitable adhesives are those final aqueous polymer dispersions whose final polymer is composed to an extent of from 0.01 to 40% by weight of monomers having at least one aldehyde or keto group and containing as additive at least one polyisocyanate whose isocyanate groups have been blocked with oximes, as described in earlier Application P 41 21 946.5. Preference is given in addition to final aqueous polymer dispersions whose final polymer has a glass transition temperature of from $-40°$ to $+50°$ C.

EXAMPLES

The particle diameters were determined by means of an analytical ultracentrifuge (W. Mächtle, Makromolekulare Chemie 185 (1984), 1025–1039, or W. Mächtle, Angewandte Makromolekulare Chemie 162 (1988), 35–42 (No. 2735)).

1) Preparation of aqueous dispersions of starting polymers

DSa): A mixture of
13.1 g of a 30% strength by weight aqueous $H_2O_2$ solution,
13.8 g of a 45% strength by weight aqueous solution of the surface active substance corresponding to Dowfax 2A1,
36.0 g of n-butyl acrylate, and
407 g of water
was ad/nixed at room temperature (27° C.) with 25% by weight of stream 2. 15 minutes later, starting at the same time, the addition commenced of the remainder of stream 2 and of stream 1, which were then added continuously over respectively 1.5 h and 1 h, the heat of reaction being removed in such a way that the reaction temperature rose to 60° C. in the course of the polymerization. The aqueous dispersion of a starting polymer obtained the weight average particle diameter of 30 nm.

Stream 1:
367 g of n-butyl acrylate
367 g of methyl methacrylate
15 g of methacrylic acid
16.5 g of a 45% strength by weight aqueous solution of the surface active substance corresponding to Dowfax 2A1, and
900 g of water Stream 2:
3.9 g of ascorbic acid
0.1 g of iron(II) sulfate, and
560 g o f water DSb): Into a mixture of
67.4 g of water
25.0 g of n-butyl acrylate,
22.5 g of a 20% strength by weight aqueous solution of the surface active substance corresponding to Dowfax 2A1, and
0.5 g of hydrogen peroxide
was stirred at room temperature (27°) in the course of 5 minutes a mixture of 2 g of water,
0.0625 g of ascorbic acid, and
0.005 g of iron(II) sulfate,
and the internal temperature rose to 55° C. This is followed by a further 30 minutes of stirring and, following addition of 0.5 g of ascorbic acid, a final 1 h of stirring. The aqueous dispersion of a starting polymer obtained had a weight average particle diameter of 30 nm.

2) Preparation of final aqueous polymer dispersions according to the invention

DFa): A mixture of
33.3 g of the aqueous starting dispersion DSa) of 1) and
2.5 g of a 20% strength by weight aqueous solution of the surface active substance corresponding to Dowfax 2A1 was heated to 85° C. and admixed at that temperature all at once with
3% by weight of stream 1 and then
20% by weight of stream 2
and stirred at 80° C. for 15 min; then the remainders of streams 1 and 2 were added continuously, starting at the same time, as per the following schedule while the 85° C. were maintained:

Stream 1: 8% by weight within 1 h
then 89% by weight within 2.5 h
Stream 2: 80% by weight within 4 h (% by weight based on total amount) On completion of the addition of stream 2 the reaction mixture was postpolymerized for 1 h Stream 1:
375 g of ethyl acrylate,
100 g of methyl methacrylate,
10 g of acrylic acid,
10 g of n-hydroxyethyl acrylate,
22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
104.17 g of water Stream 2:
2.5 g of sodium peroxodisulfate, and
100 g of water DFb): A mixture of
5 g of a 30% strength by weight $H_2O_2$ solution,
33 g of the aqueous starting dispersion DSa),
2.5g of a 20% strength by weight aqueous solution of the surface active substance corresponding to Dowfax 2A1, was heated to 50° C. and admixed at that temperature all at once with
3% by weight of stream 1 and then
20% by weight of stream 2
and stirred at 60° C. for 15 min; then the remainders of streams 1 and 2 were added continuously, starting at the same time, as per the following schedule while the 60° C. were maintained:

Stream 1: 8% by weight within 1 h
then 89% by weight within 2.5 h
Stream 2: 80% by weight within 4 h (% by weight based on total count) On completion of the addition of stream 2 the reaction mixture was postpolymerized for 1 h.
Stream 1:

22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
375 g of ethyl acrylate
100 g of methyl methacrylate,
10 g of acrylic acid,
10 g of n-hydroxyethyl acrylate,
101 g of water Stream 2:
1.5 g of ascorbic acid,
0.05 g of iron(II) sulfate and
100 g of water DFc): A mixture of
33.3 g of the aqueous starting dispersion DSa) of 1) and
2.5 g of a 20% strength by weight aqueous solution of the surface active substance corresponding to Dowfax 2A1 was heated to 85° C. and admixed at that temperature all at once with
3% by weight of stream 1 and then
20% by weight of stream 2
and stirred at 80° C. for 15 min; then the remainders of streams 1 and 2 were added continuously, starting at the same time, as per the following schedule while the 85° C. were maintained:

Stream 1: 8% by weight within 1 h
then 89% by weight within 2.5 h
Stream 2: 80% by weight within 4 h (% by weight based on total amount) On completion of the addition of stream 2 the reaction mixture was postpolymerized for 1 h.

Stream 1:
375 g of ethyl acrylate,
100 g of methyl methacrylate,
10 g of acrylic acid,
10 g of diacetone acrylamide
22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
104.17 g of water Stream 2:
2.5 g of sodium peroxodisulfate, and
100 g of water DFd): A mixture of
5 g of a 30% strength by weight $H_2O_2$ solution,
33 g of the aqueous starting dispersion DSa) of 1) and,
2.5 g of a 30% strength by weight aqueous solution of the surface active substance corresponding to Dowfax 2A1, was heated to 50° C. and admixed at that temperature all at once with
3% by weight of stream 1 and then
20% by weight of stream 2
and stirred at 60° C. for 15 min; then the remainders of streams 1 and 2 were added continuously, starting at the same time, as per the following schedule while the 60° C. were maintained:

Stream 1: 8% by weight within 1 h
then 89% by weight within 2.5 h
Stream 2: 80% by weight within 4 h (% by weight based on total amount) On completion of the addition of stream 2 the reaction mixture was post-polymerized for 1 h.

Stream 1:
22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
375 g of ethyl acrylate
100 g of methyl methacrylate,
10 g of acrylic acid,
10 g of diacetone acrylamide, and
101 g of water Stream 2:
1.5 g of ascorbic acid,
0.05 g of iron(II) sulfate and
100 g of water DFe): A mixture of
10.0 g of the aqueous starting dispersion DSa) of 1) and
2.5 g of a 20% strength by weight aqueous solution of the surface active substance corresponding to Dowfax 2A1 was heated to 85° C. and admixed at that temperature all at once with
3% by weight of stream 1 and then
20% by weight of stream 2
(50 min later stream 3 was added continuously over 2 h) and stirred at 80° C. for 15 min; then the remainders of streams 1 and 2 were added continuously, starting at the same time, as per the following schedule while the 85° C. were maintained:

Stream 1: 8% by weight within 1 h
then 89% by weight within 2.5 h
Stream 2: 80% by weight within 4 h (% by weight based on total amount) On completion of the addition of stream 2 the reaction mixture was post-polymerized for 1 h.

Stream 1:
375 g of ethyl acrylate,
100 g of methyl methacrylate,
10 g of acrylic acid,
10 g of n-hydroxyethyl acrylate
22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
104.17 g o f water Stream 2:
2.5 g of sodium peroxodisulfate, and
100 g of water Stream 3:
23.3 g of the aqueous starting dispersion DSa) of 1)

DFf): A mixture of
5 g of a 30% strength by weight $H_2O_2$ solution,
10.0 g of the aqueous starting dispersion DSa) of 1), and
2.5 g of a 20% strength by weight aqueous solution of the surface active substance corresponding to Dowfax 2A1, was heated to 50° C. and admixed at that temperature all at once with
3% by weight of stream 1 and then
20% by weight of stream 2 (50 min later stream 3 was added continuously over 2 h) and stirred at 60° C.

for 15 min; then the remainders of streams 1 and 2 were added continuously, starting at the same time, as per the following schedule while the 60° C. were maintained:

Stream 1: 8% by weight within 1 h
then 89% by weight within 2.5 h
Stream 2: 80% by weight within 4 h (% by weight based on total amount) On completion of the addition of stream 2 the reaction mixture was post-polymerized for 1 h.

Stream 1:
22.5 g of a 20% strength by weight aqueous solution of the surface active substance corresponding to Dowfax 2A1,
50 g of a 20% strength by weight aqueous mixture of ethoxylated fatty alcohols ($C_{16}$–$C_{18}$, degree of ethoxylation: 18), and
375 g of ethyl acrylate
100 g of methyl methacrylate,
10 g of acrylic acid,
10 g of n-hydroxyethyl acrylate, and
101 g of water Stream 2:
1.5 g of ascorbic acid,
0.05 g of iron(II) sulfate and
100 g of water Stream 3:
23.0 g of the aqueous starting dispersion DSa) of 1)

DFg ): Initial charge: 22.63 g of stream 2
42.00 g of stream 3
300.00 g of water Stream 1:
1710 g of n-butyl acrylate
250 g of methyl methacrylate
40 g of methacrylic acid
1 g of tert-dodecyl mercaptan
50 g of a 20% strength by weight aqueous mixture of ethoxylated fatty alcohols ($C_{16}$–$C_{18}$, degree of ethoxylation: 18),
100 g a 20% strength by weight aqueous solution of the surface active substance corresponding to Dowfax 2A1
1 g of 3-mercaptopropyltrimethoxysilane Stream 2:
13.33 g of the aqueous starting dispersion DSa) of 1,
5 g of a 20% strength by weight aqueous solution of the surface active substance corresponding to Dowfax 2A1,
8 g of a 25% strength by weight aqueous ammonia solution,
200 g of water Stream 3:
10 g of sodium peroxodisulfate
200 g of water The initial charge was heated to 85° C. (30 min later the remainder of stream 2 was added within 2 h and the remainder of stream 1 within 3 h, both added continuously starting at the same time). Then the reaction zone was continuously fed, starting at the same time, with 4% by weight of stream 1 within 30 min and stream 3 within 4 h. The temperature of the reaction mixture was maintained at a constant 85° C.

We also prepared comparative dispersions CDFa) and CDFb). They were prepared in the same way as DFa) and DFb), except that the addition of the aqueous dispersion of a starting polymer was omitted.

3) Application testing of the final aqueous polymer dispersions according to the invention and of the comparative dispersions of 2)

Rectangular glass plates (25×8 cm) were coated with samples of the dispersions at room temperature (27°) to form films having a dry thickness of 30 μm, and the films were then visually assessed. The results are shown in the table.

TABLE

| Dispersion | Specks (number/size) | Appearance |
|---|---|---|
| DFa) | 4/small | bright |
| DFb) | 6/small | bright |
| DFc) | 4/small | bright |
| DFd) | 7/small | bright |
| DFe) | 15/small | bright |
| DFf) | 10/small | bright |
| DFg) | 20/small | bright |
| CDFa) | 160/large | matt |
| CDFb) | 141/large | matt |

We claim:

1. A process for preparing final aqueous polymer dispersions, which comprises polymerizing a mixture of radical polymerizable monomers comprising
    A) from 60 to 100% by weight of at least one monomer from the group consisting of aromatic vinyl compounds having up to 20 carbon atoms, olefins of from 2 to 8 carbon atoms, vinyl and vinylidene halides, vinyl esters of monocarboxylic acids of from 1 to 20 carbon atoms, esters of α,β-monoethylenically unsaturated mono- and dicarboxylic acids of from 3 to 6 carbon atoms with alkanols of from 1 to 20 carbon atoms, and monoethylenically unsaturated nitriles of from 3 to 6 carbon atoms, and
    B) from 0 to 40% by weight of other radical copolymerizable monomers other than conjugated hydrocarbons,
with the addition of at least one aqueous dispersion of a starting polymer in a polymerization vessel by the method of free radical aqueous emulsion polymerization in the presence of surface active substances and free radical polymerization initiators with the proviso that
    a) the starting polymer is present in the at least one aqueous dispersion in the form of dispersed starting polymer particles whose weight average particle diameter is from 10 to 100 nm,
    b) the total amount of starting polymer added in the forth of the at least one aqueous dispersion of a starting polymer is from 0.01 to 10% by weight, based on the total amount of final polymer,
    c) of the total amount of the at least one aqueous dispersion of a starting polymer to be added the amount introduced into the polymerization vessel as initial charge prior to the start of the free radical aqueous emulsion polymerization is such that the total amount of starting polymer introduced as initial charge is at least 5% by weight of the total amount of starting polymer to be added in the form of the at least one aqueous dispersion,
    d) of the total amount of the at least one monomer to be polymerized the amount introduced into the polymerization vessel as initial charge prior to the start of the free radical aqueous emulsion polymerization is either nil or at most 15% by weight of the total amount,
    e) after the start of the free radical aqueous emulsion polymerization the proportion added to the polymerization vessel of the at least one aqueous dispersion of a starting polymer to be added is at most such that the amount of starting polymer contained in this added part comprises not more than 95% by weight of the total amount of starting polymer to be added,
    f) after the start of the free radical aqueous emulsion polymerization at least 85% by weight of the total amount of the at least one monomer to be polymerized is added to the polymerization vessel, in such a way that at any time of this addition the polymerization conversion of the monomers already added previously to the polymerization vessel including the monomers introduced into the polymerization vessel as initial charge is at least 80%, based on the total amount formed from the monomers added previously to the polymerization vessel and from the monomers introduced into the polymerization vessel as initial charge,
    g) at any tithe after the start of the free radical aqueous emulsion polymerization the ratio V of the mass already added previously to the polymerization vessel of the at least one starting polymer including the proportion of the at least one starting polymer introduced into the polymerization vessel as initial charge to the mass of the amount of the at least one monomer already added previously to the polymerization vessel including the proportion of the at least one monomer introduced into the polymerization vessel as initial charge, standardized for the ratio of the mass of the total amount of the at least one starting polymer to be added to the mass of the total amount of the at least one monomer to be polymerized, is not less than 0.3,
    h) after the end of the addition of the at least one monomer no further addition takes place of the at least one aqueous dispersion of a starting polymer,
    i) the final aqueous polymer dispersion contains from 1 to 8% of surface active substances, based on the total mass formed from the mass of the at least one radical polymerizable monomer and from the mass of starting polymer to be added in the forth of the at least one aqueous dispersion,
    j) at any time after the start of the free radical aqueous emulsion polymerization the mass of the amount of surface active substances present in the polymerization vessel relative to the mass of the total amount of monomers and polymer present in the polymerization vessel is at least 1%, and
    k) the total amount used of free radical polymerization initiators is from 0.1 to 5% by weight, based on the total amount of the at least one monomer to be polymerized, and is added to the polymerization vessel in the course of the free radical aqueous emulsion polymerization in such a way that the free radical aqueous emulsion polymerization continues to a minimum polymerization conversion of at least 90% of the total amount of the at least one monomer to be polymerized.

2. A process as claimed in claim 1, wherein after the start of the free radical aqueous emulsion polymerization at least 85% by weight of the total amount of the at least one monomer to be polymerized is added to the polymerization vessel, in such a way that at any time of this addition the polymerization conversion of the monomers already added previously to the polymerization vessel including the monomers introduced into the polymerization vessel as initial charge is at least 90%, based on the total amount formed from the monomers added previously to the polymerization vessel and from the monomers introduced into the polymerization vessel as initial charge.

3. A process as claimed in claim 1, wherein the mixture of monomers to be radical polymerized is composed of 90–100% by weight of at least one monomer from the group consisting of styrene, esters of acrylic or methacrylic acid with alkanols of from 1 to 8 carbon atoms, acrylonitrile and methacrylonitrile, and 0–10% by weight of one or more monomers from the group consisting of acrylic acid, methacrylic acid, acrylamide, methacrylamide, n-hydroxyethyl acrylate, n-hydroxybutyl acrylate, n-hydroxybutyl methacrylate, N-alkylolamides of acrylic and methacrylic acid with alcohols of from 1 to 4 carbon atoms, diacetoneacrylamide and acetylacetoxyethyl methacrylate.

4. A process as claimed in claim 1, wherein the mixture of monomers to be radical polymerized is composed of 55–90% by weight of ethyl acrylate, n-butyl acrylate or a mixture thereof, 10–40% by weight of methyl methacrylate, and 0–10% by weight of acrylic acid, methacrylic acid, acrylamide, methacrylamide, n-hydroxyethyl acrylate, diacetoneacrylamide, acetylacetoxyethyl methacrylate or a mixture thereof.

5. A process as claimed in claim 1, wherein using the surface active substance used comprises at least one compound of the general formula I

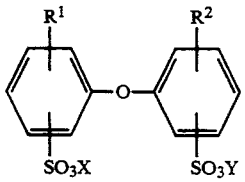

where $R^1$ and $R^2$ are each hydrogen or $C_4$–$C_{24}$-alkyl but are not both hydrogen, and X and Y are each an alkali metal or ammonium ion.

6. A process as claimed in claim 1, wherein the surface active substance used comprises a mixture of at least one ethoxylated fatty alcohol ($C_{15}$–$C_{20}$, degree of ethoxylation: 16–22) and at least one compound of the general formula I.

7. A process as claimed in claim 1, wherein the at least one aqueous dispersion of a starting polymer comprises an aqueous dispersion of polystyrene, poly-n-butyl acrylate, of a copolymer of 50–55% by weight of n-butyl acrylate, 40–45% by weight of methyl methacrylate and 0–5% by weight of methacrylic acid or a mixture thereof.

8. A process as claimed in claim 1, wherein the weight average particle diameter of the at least one aqueous dispersion of a starting polymer is from 10 to 50 nm.

9. A process as claimed in claim 1, wherein the at least one aqueous dispersion of a starting polymer contains as surface active substances only compounds of the general formula I.

10. A process as claimed in claim 1, which comprises introducing as initial charge a mixture of at least 50% by weight of the total amount of the at least one aqueous dispersion of a starting polymer to be added, 0.5–8% by weight of the total amount of the monomers to be polymerized, 5–25% by weight of the total amount of the initiator system, and 10–25% by weight of the total amount of surface active substances, heating the initial charge to the polymerization temperature, and, when a polymerization conversion of at least 80%, preferably at least 90%, based on the initially charged monomers, has been reached, adding the remainder of the polymerization batch to the ongoing polymerization.

11. A process as claimed in claim 1, wherein the monomers to be added after the start of the free radical aqueous emulsion polymerization are added continuously and with the proviso that the rate of addition increases in the course of the addition.

12. A process as claimed in claim 1, wherein at any time after the start of the free radical aqueous emulsion polymerization the mass of the amount of surface active substances added to the polymerization vessel after the start of the polymerization is not more than 6%, based on the mass of the total amount of monomers and polymer present in the polymerization vessel.

13. A process for preparing final aqueous polymer dispersions by polymerizing a mixture of radical polymerizable monomers comprising A) from 60 to 100% by weight of at least one monomer from the group consisting of aromatic vinyl compounds having up to 20 carbon atoms, olefins of from 2 to 8 carbon atoms, vinyl and vinylidene halides, vinyl esters of monocarboxylic acids of from 1 to 20 carbon atoms, esters of $\alpha, \beta$-monoethylenically unsaturated mono- and dicarboxylic acids of from 3 to 6 carbon atoms with alkanols of from 1 to 20 carbon atoms, and monoethylenically unsaturated nitriles of from 3 to 6 carbon atoms, and B) from 0 to 40% by weight of other radical copolymerizable monomers other than conjugated hydrocarbons, with the addition of at least one aqueous dispersion of a starting polymer in a polymerization vessel by the method of free radical aqueous emulsion polymerization in the presence of surface active substances and free radical polymerization initiators with the proviso that a) the starting polymer is present in the at least one aqueous dispersion in the form of dispersed starting polymer particles whose weight average particle diameter is from 10 to 100 nm, b) the total amount of starting polymer added in the form of the at least one aqueous dispersion of a starting polymer is from 0.2 to 3% by weight, based on the total amount of final polymer, c) the total amount of the at least one aqueous dispersion of a starting polymer is introduced into the polymerization vessel as initial charge prior to the start of the free radical aqueous emulsion polymerization, d) of the total amount of the at least one monomer to be polymerized the amount introduced into the polymerization vessel as initial charge prior to the start of the free radical aqueous emulsion polymerization is 0.5 to 8% by weight of the total amount, e) the final aqueous polymer dispersions contains from 1 to 8% of surface active substances, based on the total mass formed from the mass of the at least one radical polymerizable monomer and from the mass of starting polymer to be added in the form of the at least one aqueous dispersion, f) of the total amount of the surface active substances to be present in the final aqueous polymer dispersions the amount introduced into the polymerization vessel as initial charge prior to the start of the free radical aqueous emulsion polymerization is 10 to 25% by weight of the total amount, g) at any time after the start of the free radical aqueous emulsion polymerization the mass of the amount of surface active substances present in the polymerization vessel relative to the mass of the total amount of monomers and polymer present in the polymerization vessel is at least 1%, h) the total amount used of free radical polymerization initiators is from 0.1 to 5% by weight, based on the total amount of the at least one monomer to be polymerized, i) of the total amount of polymerization initiators used the amount introduced into the polymerization vessel as initial charge prior to the start of the free radical aqueous emulsion polymerization is 5 to 25% by weight of the total amount, and the remainder amount of the total amount of polymerization initiators used is added to the polymerization vessel after the start of the free radical aqueous emulsion polymerization in the course of the free radical aqueous emulsion in such a way that the free radical aqueous emulsion polymerization continues to a minimum polymerization conversion of at least 90% of the total amount of the at least one monomer to be polymerized and j) after the start of the free radical aqueous emulsion polymerization the remainder amount of the at least one monomer to be polymerized is added to the polymerization vessel preemulsified in an aqueous phase in such a way that at any time of this addition the polymerization conversion of the monomers already added previously to the polymerization vessel including the monomers introduced into the polymerization vessel as initial charge is at least 90%, based on the total amount formed from the monomers added previously to the polymerization vessel and from the monomers introduced into the polymerization vessel as initial charge.

* * * * *